Jan. 28, 1930. L. P. TIERS 1,745,196
CONVEYER FOR VENEER DRIERS
Filed Dec. 1, 1928
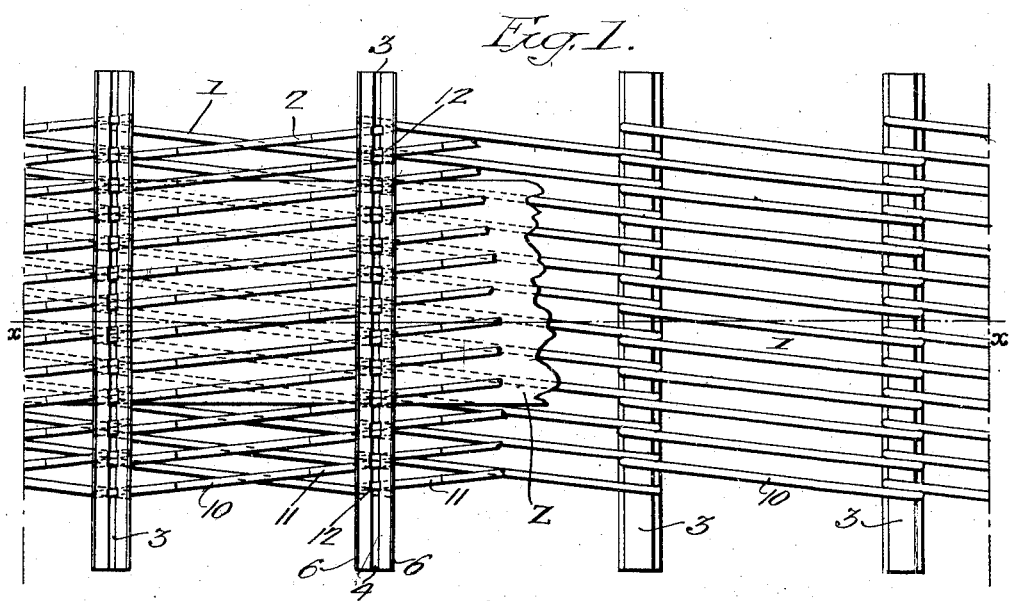
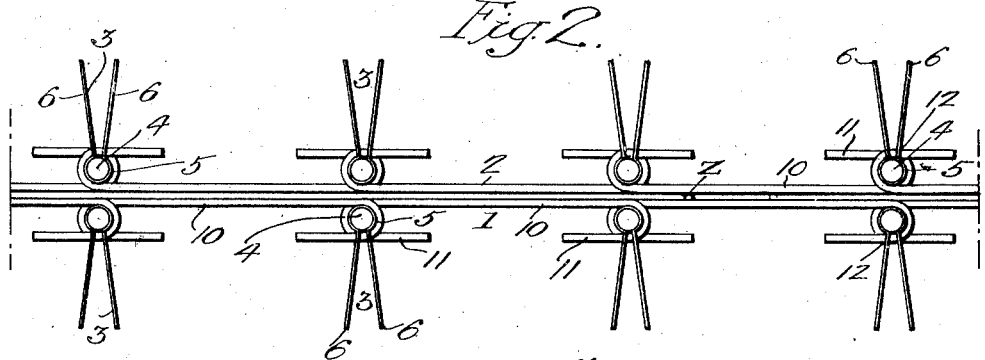
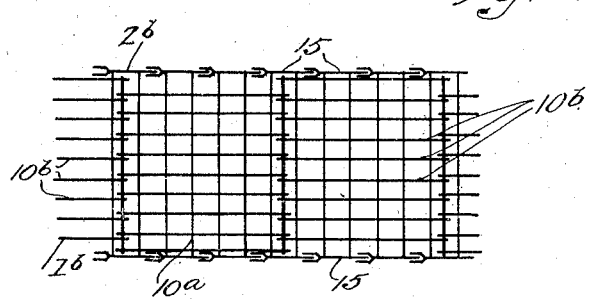
Inventor:
Louis P. Tiers,
by his Attorneys,
Howson & Howson Patented Jan. 28, 1930

1,745,196

UNITED STATES PATENT OFFICE

LOUIS P. TIERS, OF ROGERS PARK, CHICAGO, ILLINOIS, ASSIGNOR TO PROCTOR & SCHWARTZ, INCORPORATED, OF PHILADELPHIA, PENNSYLVANIA, A CORPORATION OF PENNSYLVANIA

CONVEYER FOR VENEER DRIERS

Application filed December 1, 1928. Serial No. 323,074.

This invention relates to means for conveying sheet or web material, and particularly to conveyers adapted for use with veneer drying apparatus.

In veneer driers, it is the usual practice to provide an under or lower conveyer which is adapted to support and carry the sheets of veneer through the drier, and to provide an upper conveyer which is adapted to rest on top of the sheets of veneer, for the purpose of holding the said sheets down and flat on the supporting conveyer, to keep the veneer from warping while it is being dried.

Usually these conveyers each comprises series of bars extending longitudinally of, and parallel to the line of travel of, the conveyer, and spaced apart transversely of the conveyer.

The sheets of veneer to be dried are fed between the upper and lower conveyers with the grain thereof extending substantially parallel to the line of travel of the conveyer. The veneer being very thin and having its grain running in the same general direction as the travel of the conveyer is structurally weak in a direction transversely of the conveyer, and consequently is extremely susceptible to cracking or splitting, if not carefully handled.

In order to relieve the veneer of strain caused by the weight of the hold-down conveyer resting thereon, the longitudinally extending bars of the upper or hold-down conveyer are usually placed directly above and parallel to the corresponding bars of the lower or supporting conveyer. In practice it is extremely difficult to maintain this vertical alignment of the bars of the upper and lower conveyers, and a slight lateral shifting of the upper conveyer with respect to the lower conveyer will cause the bars of the lower conveyer to assume positions above the spaces between the bars of the lower conveyer, resulting in a warping of the veneer located between the conveyers. Obviously such a condition will cause the veneer to assume a wave-like form transversely thereof and in many cases will resist the contracting action of the sheet of veneer to such an extent that the said sheet will split in the direction of the grain of the veneer.

The object of this invention is to provide a supporting conveyer and a hold-down conveyer, each having bars extending substantially longitudinally of the conveyers but at an angle with respect to the longitudinal center line of the said conveyers, the angle of the bars of the upper conveyer being reversed with respect to the angle of the bars of the lower conveyer, in order that the said bars of the upper conveyer will at all times lie across the bars of the lower conveyer and will at no time be permitted to assume a position parallel to the bars of the lower conveyer or to assume a position above and in line with the spaces between the said lower bars.

The invention will hereinafter be described in detail, reference being had to the accompanying drawings, of which:

Fig. 1 is a plan view of a supporting conveyer and a hold-down conveyer, showing a sheet of veneer positioned between the two conveyers, a portion of the upper conveyer being removed for the purpose of illustration;

Fig. 2 is a side elevation of the structure shown in Fig. 1; and

Fig. 3 illustrates a modified form of the invention.

In the drawings, the lower or supporting conveyor is indicated at 1, and the upper or hold-down conveyer is illustrated at 2. Each of these conveyers comprises a series of transversely extending girts 3. Each girt comprises a cross bar 4 having a sheet metal sleeve 5 extending around the greater part of its circumference, the said sleeve 5 being provided with divergent wings 6, 6, for purposes hereinafter described.

Extending longitudinally of each conveyer between the spaced girts 3 thereof are series of rods or bars 10, the opposite ends of which are bent around the girts 3 in the manner illustrated in Fig. 2, the said bent ends being in the form of hooks 11, 11. The bent portions 11 of the bars 10 extend around the outside of the sleeves 5 and through suitable openings 12 formed in the wings 6, 6 of the girts 3. The openings 12 are spaced transversely of the conveyer and thereby maintain the ends of the respective bars 10 in spaced relation with respect to each other, transversely of the conveyer.

As shown in Fig. 1, the bars 10 of the lower conveyer are disposed at an angle with respect to the longitudinal center line $x$—$x$ of the conveyers and the bars 10 of the upper conveyer 2 are disposed at a reverse angle with respect to the said center line $x$—$x$ and relative to the angle of the bars of the lower conveyer 1.

As shown in Fig. 1, the grain of the sheet of veneer $z$ located between the conveyers 1 and 2 extends substantially parallel to the center line $x$—$x$ of the conveyer. Thus it will be seen that by placing the bars of the conveyers at an angle with respect to said center line and in reverse relation to each other the said bars at all times are caused to cross each other at predetermined intervals along the conveyers and at no time do the bars of the respective conveyers assume a position parallel to the bars of the other conveyer, thus obviating the possibility of the bars of the upper conveyer forcing the veneer down into the spaces between the bars of the lower conveyer, and thereby preventing the warping or splitting of the veneer in the manner above noted.

The series of bars 10 extending respectively between the girts 3 constitute a plurality of link sections which are pivotally connected together by said girts to form complete endless belt conveyers, permitting the conveyers to change their directions of travel at the opposite ends of the drying apparatus in which the conveyers are located. The girts 3 are usually attached at their opposite ends to suitable carrying chains (not shown).

As shown in Fig. 1, the openings 12 in the girts 3 are equally spaced and correspondingly located in all of the girts, and in order to obtain the angular disposition of the bars 10 one end of one of the bars 10 will be located in the space 12 nearest one of the ends of one of said girts, and the opposite end of the said bar will be positioned in the second opening 12 from the corresponding end of the next adjacent girt 3, and all of the other bars 10 of the series will be correspondingly located on the girts across the conveyer.

While I have described my invention in connection with the drying of sheets of veneer, obviously the invention is applicable to the conveying of any class of sheet or web material without departing from the spirit of the invention.

I have described the bars of both conveyers as being disposed at an angle relative to the longitudinal center line of the conveyers, but obviously the bars of one conveyer may be disposed parallel to the said center line and the bars of the other conveyer disposed at an angle with respect thereto.

In Fig. 3, I have diagrammatically illustrated a device in which the bars $10^a$ of the lower conveyer $1^a$ extend parallel to the center line of the said conveyers and the bars $10^b$ of the upper conveyer $2^a$ extend at right angles thereto, these bars $10^b$ being carried by suitable side chains 15, 15.

I claim:

1. Means for conveying sheet material comprising a pair of superposed conveyers adapted to receive a sheet of material therebetween, each conveyer comprising a series of bars extending substantially longitudinally of the conveyers and spaced apart transversely of the conveyers, the bars of at least one of said conveyers being disposed at an angle relative to the longitudinal center line of the conveyers.

2. Means for conveying sheet material comprising a pair of superposed conveyers adapted to receive a sheet of material therebetween, each conveyer comprising a series of bars extending substantially longitudinally of the conveyers and spaced apart transversely of the conveyers, the bars of each conveyer being disposed at an angle relative to the longitudinal center line of the conveyers, and the angle of the bars of one of said conveyers being reversed with respect to the angle of the bars of the other said conveyer.

3. Means for conveying sheet material comprising a pair of superposed conveyers adapted to receive a sheet of material therebetween, each conveyer comprising a series of bars extending substantially longitudinally of the conveyers and spaced apart transversely of the conveyers, the bars of each conveyer being disposed at an angle relative to the longitudinal center line of the conveyers, and the angle of the bars of one of said conveyers being reversed with respect to the angle of the bars of the other said conveyer the bars of the respective conveyers crossing each other at spaced intervals longitudinally of the conveyers.

4. A conveyer for sheet material, comprising a plurality of girts extending transversely of the conveyer and spaced apart longitudinally of the conveyer, a series of bars carried by said girts and extending substantially longitudinally of the conveyer and spaced apart transversely of the conveyer, said bars being disposed at an angle with respect to the longitudinal center line of the conveyer, and a second conveyer similar in construction to the first said conveyer and positioned on top of said first conveyer with the bars of the said second conveyer disposed at a reverse angle with respect to the bars of the first said conveyer.

5. A conveyer for sheet material, comprising a plurality of girts extending transversely of the conveyer and spaced apart longitudinally of the conveyer, a series of bars carried by said girts and extending substantially longitudinally of the conveyer and spaced apart transversely of the conveyer, said bars being disposed at an angle with respect to the longitudinal center line of the conveyer, a second conveyer similar in construction to the first said conveyer and positioned on top of said first conveyer with the bars of the said second conveyer disposed at a reverse angle with respect to the bars of the first conveyer, and means on said girts for maintaining said bars in said spaced relation.

6. A conveyer for sheet material, comprising a plurality of girts extending transversely of the conveyer and spaced apart longitudinally of the conveyer, a series of bars carried by said girts and extending substantially longitudinally of the conveyer and spaced apart transversely of the conveyer, said bars being disposed at an angle with respect to the longitudinal center line of the conveyer, and a second conveyer similar in construction to the first said conveyer and positioned on top of said first conveyer with the bars of the said second conveyer disposed at a reverse angle with respect to the bars of the first said conveyer, the girts of the second said conveyer being substantially in vertical alignment with the respective girts of the first said conveyer and the angularly disposed bars of the second said conveyer crossing the bars of the first said conveyer intermediate said girts.

LOUIS P. TIERS.